United States Patent [19]

Buran et al.

[11] Patent Number: 4,756,841
[45] Date of Patent: Jul. 12, 1988

[54] FRICTION-REDUCING COATING COMPOSITIONS AND COATED MACHINE PART

[75] Inventors: Ulrich Buran, Burscheid; Manfred Fischer, Leichlingen; Martin Morsbach, Burscheid; Hans-Jochem Neuhäuser, Bergisch-Gladbach, all of Fed. Rep. of Germany

[73] Assignee: Goetze AG, Burscheid, Fed. Rep. of Germany

[21] Appl. No.: 856,372

[22] Filed: Apr. 28, 1986

[30] Foreign Application Priority Data

Apr. 26, 1985 [DE] Fed. Rep. of Germany ....... 3515107

[51] Int. Cl.$^4$ .......................................... C10M 103/04
[52] U.S. Cl. ........................................ 252/26; 75/240; 75/251; 75/252
[58] Field of Search ................... 252/26; 75/251, 252, 75/240

[56] References Cited

U.S. PATENT DOCUMENTS

| | | | |
|---|---|---|---|
| 3,556,747 | 1/1971 | Hyde et al. | 29/198 |
| 4,334,927 | 6/1982 | Hyde et al. | 75/240 |
| 4,597,939 | 7/1986 | Neuhauser et al. | 420/580 |

FOREIGN PATENT DOCUMENTS

| | | |
|---|---|---|
| 2433814 | 1/1974 | Fed. Rep. of Germany . |
| 2841552 | 2/1980 | Fed. Rep. of Germany . |
| 3247054 | 10/1984 | Fed. Rep. of Germany . |

*Primary Examiner*—William R. Dixon, Jr.
*Assistant Examiner*—Ellen McAvoy
*Attorney, Agent, or Firm*—Spencer & Frank

[57] ABSTRACT

Friction-reducing coating compositions and coated machine parts having a wearing surface provided with coatings of same. In one embodiment, the coating composition includes from 10 to 25 weight % molybdenum metal; from 55 to 70 weight % nickel alloy; and from 5 to 25 weight % chromium carbide $Cr_3C_2$. In a second embodiment, the coating composition includes from 25 to 45 weight % molybdenum metal; from 45 to 60 weight % nickel alloy; and from 5 to 25 weight % of a hard substance selected from chromium metal, chromium carbide $Cr_{23}C_6$ and molybdenum carbide $Mo_2C$. Preferably the nickel alloys contain from 73 to 95 weight % nickel and have a melting point below that of nickel metal. Preferably the friction-reducing coating is applied to a wearing surface by plasma flame spraying. These coatings impart excellent wear resistance to the wearing surface, while lowering wear of counter-running faces.

14 Claims, No Drawings

FRICTION-REDUCING COATING COMPOSITIONS AND COATED MACHINE PART

BACKGROUND OF THE INVENTION

1. Field of the Invention

The present invention relates to a coating composition which is a spray powder for the production of wear resistant, burn trace resistant and break-away resistant coatings for the bearing faces of machine parts that are to be subjected to friction stresses and wear, and in particular, to a coating composition for friction-reducing coatings for wearing surfaces of machine parts, for example, piston rings, the fire lands of pistons of high rpm and highly stressed internal combustion engines, and the bearing faces of synchronizing rings.

2. Background of the Art

In order to increase wear resistance, the bearing faces of machine parts exposed to sliding friction have been provided with hard coatings, such as electrochemically deposited, chromium metal coatings or thermally-applied sprayed coatings of molybdenum metal. The molybdenum metal coating may be applied to the wearing surface of a machine part either over the entire area as an overcoating or only partially, into grooves in unilaterally or bilaterally chambered form. The sprayed coatings may be applied by the known flame spraying technique using a plasma-arc gun.

Sprayed-on molybdenum coatings on, for example, the bearing faces of piston rings have excellent burn trace resistance and, due to their good oil retention properties, are superior to electrochemically deposited chromium coatings layers. Molybdenum coatings, however, are less wear resistant than electrochemically deposited chromium layers and, primarily due to increased porosity and brittleness during engine operation, larger regions of the coating may delaminate and break-away, and cause engine malfunctions.

In order to further increase wear resistance, molybdenum has been alloyed with other elements and hard substances, such as the nitrides, oxides or carbides of metals, have been added to the powdered alloy. For example, according to German Patent Number (DE-AS) No. 2,433,814, molybdenum is alloyed with from 0.5 to 45 weight percent of a heavy metal, i.e., a metal of atomic weight greater than sodium, and from 0.8 to 10 weight percent silicon. According to German Laid-Open Patent Application No. (DE-OS) 2,841,552, molybdenum containing from 3 to 40 weight percent of a molybdenum alloy is disclosed. According to U.S. Patent No. 3,556,747, the disclosed spray powder is composed of a mixture of from 5 to 50 weight % molybdenum, from 37.5 to 95 weight % chromium carbide $Cr_3C_2$ and up to 23.75 weight % of a nickel-chromium alloy.

Due to the addition of hard substances, the molybdenum alloy layers produced with spray powders according to these references are significantly more wear resistant. The high percentage of hard substances, however, has the disadvantageous result of increasing the wear of the counter-running faces which frictionally mate with wearing surfaces coated with these friction-reducing coating compositions. Particles abraded from the counter-bearing surfaces or particles of hard substances from the coated surface itself may cause further damage to the machine.

Responsive to the foregoing problem, a piston ring coating was developed, according to U.S. Patent No. 4,334,927, which was prepared for a coating composition composed of 51 weight % molybdenum, from 5 to 20 weight % chromium carbide $Cr_3C_2$ and from 32 to 51 weight % of a nickel-chromium alloy. Due to the low percentage of the hard carbide substance, wear of counter-bearing faces is reduced and, at most, only particles which cause a low level of abrasive wear result, however, the wear resistance of the sprayed-on coatings themselves is reduced. Such lowered wear resistance is then no longer adequate for coated parts subjected to high frictional stresses, for example, in high rpm internal combustion engines.

According to German Laid-Open Patent Application No. (DE-OS) 3,247,054, molybdenum carbide $Mo_2C$ was used as the hard substance and spray powders for producing such coatings are composed of from 20 to 60 weight % molybdenum, from 25 to 50 weight % molybdenum carbide and up to 30 weight % of a low melting point nickel-chromium alloy. Good wear behavior was noted for these coatings and also with respect to their counter-running partners. During engine operation, particularly in internal-combustion engines, coated piston rings exhibited satisfactory strength values. However, for engines subject to extreme frictional stresses, coated piston rings having even further improved strength, wear resistance and break-away resistance would be advantageous.

SUMMARY OF THE INVENTION

It is therefore an object of the present invention to provide an improved friction-reducing coating composition in the form of a spray powder for application thereof by spraying onto surfaces of machine parts which are to be subjected to frictional stresses and wear and which coated machine parts exhibit good wear resistance, as well as optimized break-away resistance and freedom from burn traces even under extreme stresses.

This object is accomplished by the present invention which provides a friction-reducing coating composition in the form of a spray powder composed of, in a first embodiment, from 10 to 25 weight % molybdenum, from 55 to 70 weight % of a nickel alloy, which is preferably a low melting point nickel alloy, and from 5 to 25 weight % of chromium carbide $Cr_3C_2$. In a second embodiment, the coating composition is composed of from 25 to 45 weight % molybdenum, from 45 to 60 weight % of a nickel alloy, which is preferably a low melting point nickel alloy, and from 5 to 25 weight percent of a hard substance selected from chromium metal, chromium carbide $Cr_{23}C_6$, molybdenum carbide ($Mo_2C$) and mixtures thereof.

The preferred nickel alloy is a low melting point nickel alloy, and has a melting point below that for nickel of 1,455° C. Used successfully, is a nickel-chromium alloy composed of from 75 to 85 weight % nickel and from 15 to 25 weight % chromium; a nickel-aluminum alloy composed of from 90 to 95 weight % nickel and from 5 to 10 weight % aluminum; and a nickel-chromium-aluminum alloy composed of from 73 to 78 weight % nickel, from 4 to 6 weight % aluminum and from 17 to 22 weight % chromium.

It has been found that, in spite of the extremely high content of low melting point nickel alloy, not only is the strength and break-away resistance of the coatings increased, but also their wear resistance and freedom from burn traces is increased. In engine test-runs, the performance of piston rings coated with the coating compositions according to the present invention confirmed the desired characteristics.

It was also surprising according to the second embodiment of the coating composition, that instead of the chromium carbide $Cr_3C_2$ employed in the two previously mentioned U.S. patents, chromium carbide $Cr_{23}C_6$, molybdenum carbide $Mo_2C$ and/or elemental chromium were found to be alternatively useful. Further, whether chromium carbide $Cr_{23}C_6$, molybdenum carbide $Mo_2C$ or elemental chromium were used alone or in combination, the coatings made therefrom had approximately the same good results.

The preferred spray coating technique is the well-known flame spraying technique using a plasma-arc gun. When this technique is used, although other methods for thermally-applying these sprayed coatings can be used, the easier wettability and solubility of the hard substances according to the invention in the nickel alloys, which melt during spraying, result in a significantly improved cohesion of these hard substances in the coating compared to the cohesion of chromium carbide $Cr_3C_2$. For example, for equivalently good wear and break-away resistance, the percentage of low melting point nickel alloy could be reduced and the percentage of molybdenum increased, respectively. The higher molybdenum percentage in such a coating results in an even further improved resistance to burn traces.

DESCRIPTION OF THE PREFERRED EMBODIMENTS

Thus, the present invention provides a coating composition with which, preferably in a plasma spray process, highly wear resistant, burn trace resistant and break-away resistant coatings can be applied to wearing surfaces of machine parts, particularly to piston rings and the fire land regions of pistons in internal combustion engines and on synchronizing rings. The resulting values for the inventive coatings are so good that such coatings are able to withstand even extreme stresses as encountered in high rpm diesel engines. The use of chromium, molybdenum carbide $Mo_2C$, and chromium carbide $Cr_{23}C_6$ according to the present invention permits an increase in the molybdenum percentage in the coating and thus additionally improves the burn trace behavior of the coating.

Preferably, the spray powders according to the invention are employed in mixtures of the individual components with one another. However, it is within the scope of the present invention for the spray powder to also contain a compounded powder or pressed micropellets of at least two components. In the sense of the present invention, the friction-reducing coating compositions may also be used with advantage as a coating for machine parts in general so as to realize improved wear resistance, burn trace resistance and/or break-away resistance.

In test runs, good results were obtained with the following, exemplary spray powder compositions which were weighed together as a simple mixture of powdered components and were flame sprayed onto a wearing surface of a machine part, using a plasma-arc gun operated in the well-known manner:

Spray Powder 1

40 weight % molybdenum
10 weight % chromium
50 weight % nickel chromium alloy containing 20 weight % chromium

Spray Powder 2

40 weight % molybdenum
10 weight % of the chromium carbide $Cr_{23}C_6$
50 weight % nickel chromium alloy containing 20 weight % chromium

Spray Powder 3

33 weight % molybdenum
12 weight % molybdenum carbide $Mo_2C$
55 weight % of a nickel chromium alloy containing 20 weight % chromium

Spray Powder 4

22 weight % molybdenum
17 weight % of the chromium carbide $Cr_3C_2$
61 weight % of a nickel-chromium alloy containing 20 weight % chromium It will be understood that the above description of the present invention is susceptible to various modifications, changes and adaptations, and the same are intended to be comprehended within the meaning and range of equivalents of the appended claims.

What is claimed is:

1. A friction-reducing coating composition, comprising:
   from 10 to 25 weight % molybdenum metal;
   from 55 to 70 weight % nickel alloy; and
   from 5 to 25 weight % chromium carbide $Cr_3C_2$,
   wherein the coating composition has the form of a spray powder for application thereof by spraying onto surfaces of machine parts which are to be subjected to frictional stresses and wear.

2. The composition according to claim 1, wherein the nickel alloy contains from 75 to 85 weight % nickel and from 15 to 25 weight % chromium.

3. The composition according to claim 1, wherein the nickel alloy contains from 90 to 95 weight % nickel and from 5 to 10 weight % aluminum.

4. The composition according to claim 1, wherein the nickel alloy contains from 73 to 78 weight % nickel, from 4 to 6 weight % aluminum, and from 17 to 22 weight % chromium.

5. The composition according to claim 1, wherein the spray powder is a mixture of powdered components.

6. The composition according to claim 1, wherein the spray powder includes one of a compounded powder of at least two powdered components and pressed micropellets of at least two components.

7. The composition according to claim 1, wherein the nickel alloy has a melting point below 1,455° C. and wherein the composition is adapted for application by plasma flame spraying.

8. A friction-reducing coating composition, comprising:
   from 25 to 45 weight % molybdenum metal;
   from 45 to 60 weight % nickel alloy; and
   from 5 to 25 weight % of a hard substance selected from chromium metal, chromium carbide $Cr_{23}C_6$ and molybdenum carbide $Mo_2C$ and mixtures thereof,
   wherein the coating composition has the form of a spray powder for application thereof by spraying onto surfaces of machine parts which are to be subjected to frictional stresses and wear.

9. The composition according to claim 8, wherein the nickel alloy contains from 75 to 85 weight % nickel and from 15 to 25 weight % chromium.

10. The composition according to claim 8, wherein the nickel alloy contains from 90 to 95 weight % nickel and from 5 to 10 weight % aluminum.

11. The composition according to claim 8, wherein the nickel alloy contains from 73 to 78 weight % nickel, from 4 to 6 weight % aluminum, and from 17 to 22 weight % chromium.

12. The composition according to claim 8, wherein the spray powder is a mixture of powdered components.

13. The composition according to claim 8, wherein the spray powder includes one of a compounded powder of at least two powdered components and pressed micropellets of at least two components.

14. The composition according to claim 8, wherein the nickel alloy has a melting point below 1,455° C. and wherein the composition is adapted for application by plasma flame spraying.

* * * * *